(12) United States Patent
Tecu

(10) Patent No.: US 8,497,933 B2
(45) Date of Patent: Jul. 30, 2013

(54) SCANNING ACTIVE ILLUMINATION MEDIA

(75) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/250,993

(22) Filed: Sep. 30, 2011

(65) Prior Publication Data

US 2013/0083217 A1    Apr. 4, 2013

(51) Int. Cl.
*G03B 7/00* (2006.01)
*H04N 5/235* (2006.01)

(52) U.S. Cl.
USPC ............... 348/362; 348/229.1; 348/333.01; 348/221.1

(58) Field of Classification Search
USPC .............. 348/362–366, 229.1, 333.01, 221.1; 358/487, 475, 446, 448, 461
See application file for complete search history.

(56) References Cited

U.S. PATENT DOCUMENTS

| 6,486,915 B2 * | 11/2002 | Bell et al. ...................... 348/362 |
| 7,986,356 B2 * | 7/2011 | Chang et al. .................. 348/254 |
| 2009/0096994 A1 * | 4/2009 | Smits .............................. 353/30 |

* cited by examiner

*Primary Examiner* — Yogesh Aggarwal
(74) *Attorney, Agent, or Firm* — Osha Liang LLP

(57) ABSTRACT

A method for obtaining an image of an actively lit medium (ALM) using a capture device and an illumination source, including: calibrating the capture device for dark signal non-uniformity (DSNU); determining a final exposure value and a final gain value by executing at least one scan of the ALM using the capture device with the illumination source extinguished; and generating the image by scanning, with the illumination source extinguished, the ALM using the capture device set to the final exposure value and the final gain value.

20 Claims, 4 Drawing Sheets

SCANNING ACTIVE ILLUMINATION MEDIA

BACKGROUND

Scanners and multifunction printers (MFPs) with scanning functionality are used extensively by businesses and consumers. Scanners are used to generate electronic images of passive media (e.g. paper documents) by laying the media on a platen, illuminating the passive media with an illumination source (i.e., active illumination), and capturing an image of the passive media with a capture device. Active illumination is typically off the optical axes. However, because passive media diffusely reflects light, the passive media can be imaged back into the capture device with adequate illumination, resulting in a quality output.

Many hardware devices, including mobile hardware devices (e.g., smart phones, tablets, e-readers, etc.), include display screens that operate using an actively lit medium (ALM) (e.g., a backlit liquid crystal display (LCD)). An ALM, unlike passive media, is generally not diffusively reflective. Further, the light emitted by an ALM is less bright than the light reflected by passive media subject to active illumination. Accordingly, images acquired by scanning such display screens show the display screens as dark (i.e., contents of the screen are not visible). Regardless, users still wish to capture/image the contents of an ALM by scanning the ALM.

SUMMARY

In general, in one aspect, the invention relates to a method for obtaining an image of an actively lit medium (ALM) using a capture device and an illumination source. The method comprises: calibrating the capture device for dark signal non-uniformity (DSNU); determining a final exposure value and a final gain value by executing at least one scan of the ALM using the capture device with the illumination source extinguished; and generating the image by scanning, with the illumination source extinguished, the ALM using the capture device set to the final exposure value and the final gain value.

In general, in one aspect, the invention relates to a non-transitory computer readable storage medium storing instructions for obtaining an image of an actively lit medium (ALM) using a capture device and an illumination source. The instructions comprise functionality for: calibrating the capture device for dark signal non-uniformity (DSNU); determining a final exposure value and a final gain value from at least one scan of the ALM created by the capture device with the illumination source extinguished; and generating the image from scanning, with the illumination source extinguished, the ALM using the capture device set to the final exposure value and the final gain value.

In general, in one aspect, the invention relates to a system for obtaining an image of an actively lit medium (ALM). The system comprises: an illumination source and a capture device; a dark calibrator configured to calibrate the capture device for dark signal non-uniformity (DSNU); an optics settings module configured to determine a final exposure value and a final gain value from at least one scan of the ALM created by the capture device with the illumination source extinguished; and an imaging engine configured to generate the image from scanning, with the illumination source extinguished, the ALM using the capture device set to the final exposure value and the final gain value.

Other aspects of the invention will be apparent from the following description and the appended claims.

DETAILED DESCRIPTION

Figure 1:
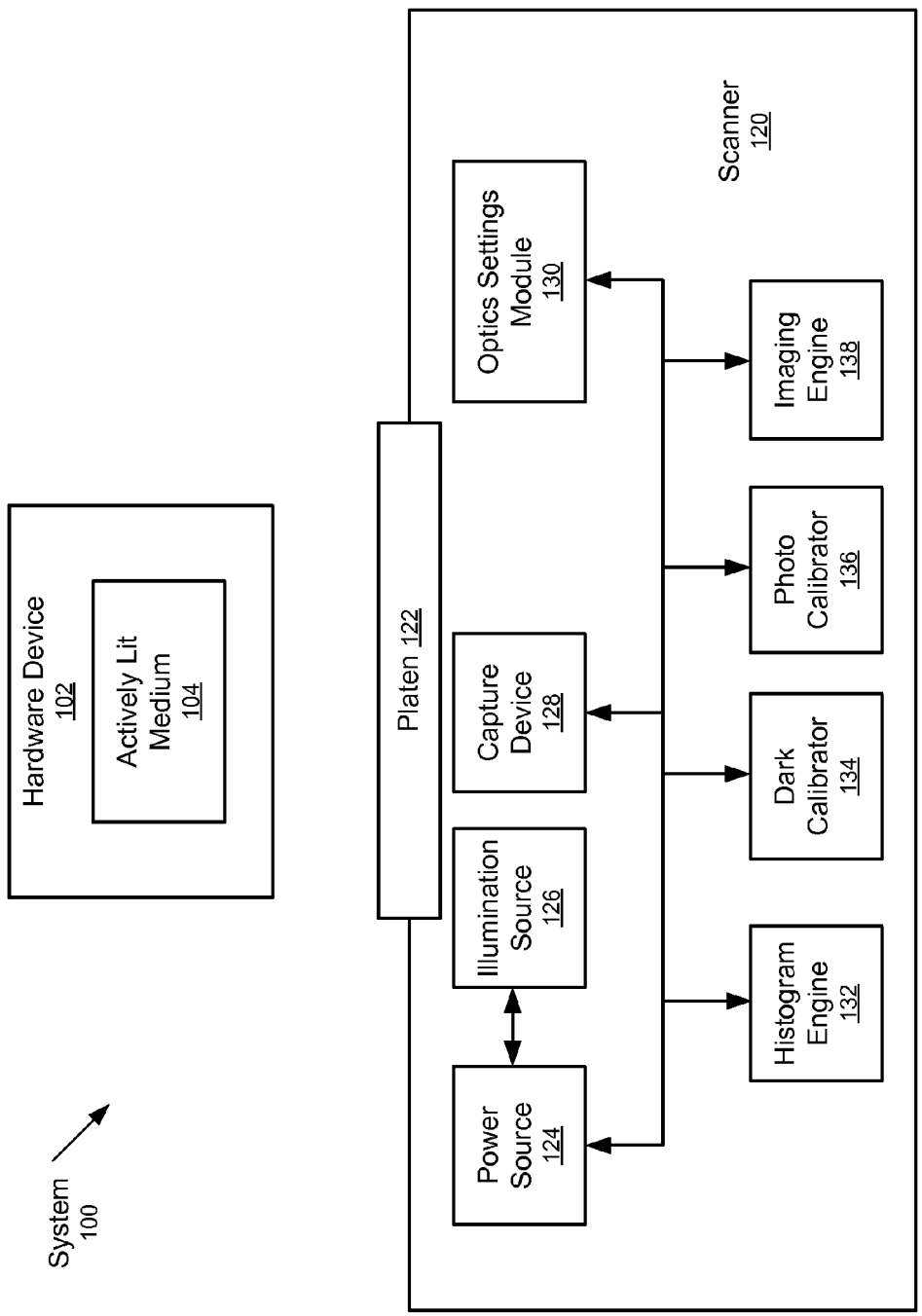
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for generating an image of an ALM using an external scanner or a scanner that is part of a MFP. Specifically, following a dark signal non-uniformity (DSNU) calibration, gain and exposure values for the scanner are determined by scanning the ALM with the illumination source of the scanner extinguished. Then, while keeping the determined gain and exposure values fixed, a photo response non-uniformity (PRNU) calibration may be performed by varying the electrical current through the illumination source of the scanner. Finally, following the PRNU calibration, the illumination source of the scanner is extinguished and a final scan of the ALM may be executed.

FIG. 1 shows a system (100) in accordance with one or more embodiments of the invention. As shown in FIG. 1, the system (100) has multiple components including as a hardware device (102) and a scanner (120). These components are described below. Although FIG. 1 shows only the hardware device (102) and the scanner (120), those skilled in the art, having the benefit of this detailed description, will appreciate that the system (100) may have any number of hardware devices and/or scanners.

In one or more embodiments of the invention, the hardware device (102) is a mobile device such as a smart phone, a PDA, a tablet, an e-reader, a laptop computer, etc. As shown in FIG. 1, the hardware device (102) includes an ALM (104) for displaying contents (e.g., text, images, photographs, video clips, animation, 2D codes, etc.) retrieved and/or generated by the hardware device (102). The ALM (104) may be a backlit LCD. Further, the ALM (104) may be a touchscreen (i.e. responsive to tactile input) and thus used by the hardware device (102) to receive input from a user.

In one or more embodiments of the invention, the scanner (120) is configured to image the ALM (104). The scanner (120) may be an external scanner. Alternatively, the scanner (120) may be a component of a MFP. Each component and/or engine of the scanner (120) is described below. Those skilled in the art will appreciate that each of the components and/or engines described may have other functionality beyond that disclosed, and that the functionality of each component and/or engine may alternatively be performed by any of the other component and/or engines.

In one or more embodiments of the invention, the platen (122) is a surface on which media is placed to be scanned by the scanner (120). Accordingly, it may be necessary for the user of the hardware device (102) to place the hardware device (102) on the platen (122) in order for the scanner (120) to image the ALM (104). The platen (122) may be a flat largely transparent (e.g., glass) surface. The platen (122) may also be referred to as a flatbed.

In one or more embodiments of the invention, the illumination source (126) is configured to illuminate the platen (122) and any media placed on the platen (122). For example, the illumination source (126) may be a xenon or cold cathode fluorescent. As yet another example, the illumination source (126) may be a set of light emitting diodes (LEDs). In one or more embodiments of the invention, the illumination source (126) is stationary. Alternatively, the illumination source (126) may move across the platen (122). Those skilled in the art, having the benefit of this detailed description, will appreciate that the brightness of the illumination source (126) may be adjusted (i.e., brightened or dimmed) by varying the electrical current passing through the illumination source (126).

In one or more embodiments of the invention, the power source (124) is configured to supply and control the voltage/current/power delivered to the illumination source (126). Further, the power source (124) may convert the electrical energy supplied to the scanner (120) to electrical energy suitable for use by the illumination source (126). Further still, the power source (124) may be accessed/controlled using software code. Those skilled in the art will appreciate that the power source (124) may perform other functions beyond those disclosed.

In one or more embodiments of the invention, the capture device (128) is configured to scan a medium (e.g., ALM (104)) placed on the platen (122). Accordingly, the capture device (128) may include one or more imaging sensors, such as a charge-coupled device (CCD) or complementary metal oxide semiconductor (CMOS) sensor. In a CCD image sensor, photodiodes are used to absorb photons (e.g., photons reflected/diffused/emitted from a medium on the platen (122)) and produce charges representing sensed pixels. The CCD is used to read out these charges. A CMOS sensor is an image sensor consisting of an integrated circuit containing an array of pixel sensors, each pixel containing a photo detector and an active amplifier. In one or more embodiments of the invention, the capture device (128) moves across the platen (122) to scan the medium on the platen (122).

In one or more embodiments of the invention, an optics settings module (130) is configured to determine exposure and gain values for the capture device (128). For example, the optics settings module (130) may determine exposure and gain values for the capture device (128) by executing multiple scans of the media (e.g., ALM (104)) on the platen (122) with the different exposure and/or gain settings, and then identifying one or more resulting images with a well balanced histogram. In one or more embodiments of the invention, exposure corresponds to the time during which the sensor(s) in the capture device (128) are active and absorbing photons. Once the exposure time has lapsed, the sensor(s) are deactivated. In one or more embodiments of the invention, gain corresponds to the factor by which the signal(s) output by the sensor(s) in the capture device (128) and/or the capture device (128) itself are amplified. In one or more embodiments of the invention, when an ALM (e.g., ALM (104)) is placed on the platen (122), the exposure and gain values are determined with the illumination source (126) extinguished. Those skilled in the art will appreciate that the optics settings module (130) may perform other functions beyond those disclosed.

In one or more embodiments of the invention, the dark calibrator (134) is configured to calibrate the capture device (128) for DSNU. DSNU describes a parameter of fixed pattern noise (FPN). FPN is a noise pattern on digital imaging sensors that is often noticeable during longer exposure shots where certain pixels are susceptible to giving brighter intensities above the general background noise. DSNU refers to the offset from the average across the imaging array at a particular setting (e.g. temperature, integration time) with no external illumination. In other words, DSNU may be the variation of pixel brightness without illumination (i.e., with the illumination source (126) extinguished). Those skilled in the art will appreciate that the dark calibrator (134) may perform other functions beyond those disclosed.

In one or more embodiments of the invention, the photo calibrator (136) is configured to calibrate the capture device (128) for PRNU with the illumination source (126) activated and the capture device (128) set to fixed gain and exposure values. PRNU, like DSNU, is another parameter of FPN. PRNU refers to the gain or ratio between optical power on a pixel versus the electrical signal output. In other words, PRNU may be the variation of pixel brightness under illumination (i.e., with the illumination source (126) activated). In one or more embodiments of the invention, the photo calibrator (136) calibrates the capture device (128) for PRNU by executing multiple scans with different non-zero electrical currents passing through the illumination source (126), and then identifying one or more resulting images with a well balanced histogram. Those skilled in the art will appreciate that the photo calibrator (136) may perform other functions beyond those disclosed.

In one or more embodiments of the invention, the histogram engine (132) is configured to generate histograms from scans generated by the capture device (128). Accordingly, the histogram engine (132) may be accessible and utilized by the dark calibrator (134), the photo calibrator (136), and/or the optics settings module (130). A histogram is a graphical representation showing a distribution of data (e.g. pixel brightness). Those skilled in the art, having the benefit of this detailed description, will appreciate that the histogram engine (132) may perform other functions beyond those disclosed.

In one or more embodiments of the invention, the imaging engine (138) is configured to generate an image once the gain and/or exposure values have been determined and the PRNU and DSNU calibrations have been performed. In other words, the imaging engine (138) may generate a compressed or uncompressed image in any format (e.g., BMP, GIF, JPEG, TIFF, etc.) from output (i.e., a scan) produced by the capture device (128) while the capture device (128) is set to the determined exposure/gain values, and while the illumination source (126) is extinguished. The resulting image (i.e., image file) may be printed, faxed, emailed, stored, etc.

Figure 2:
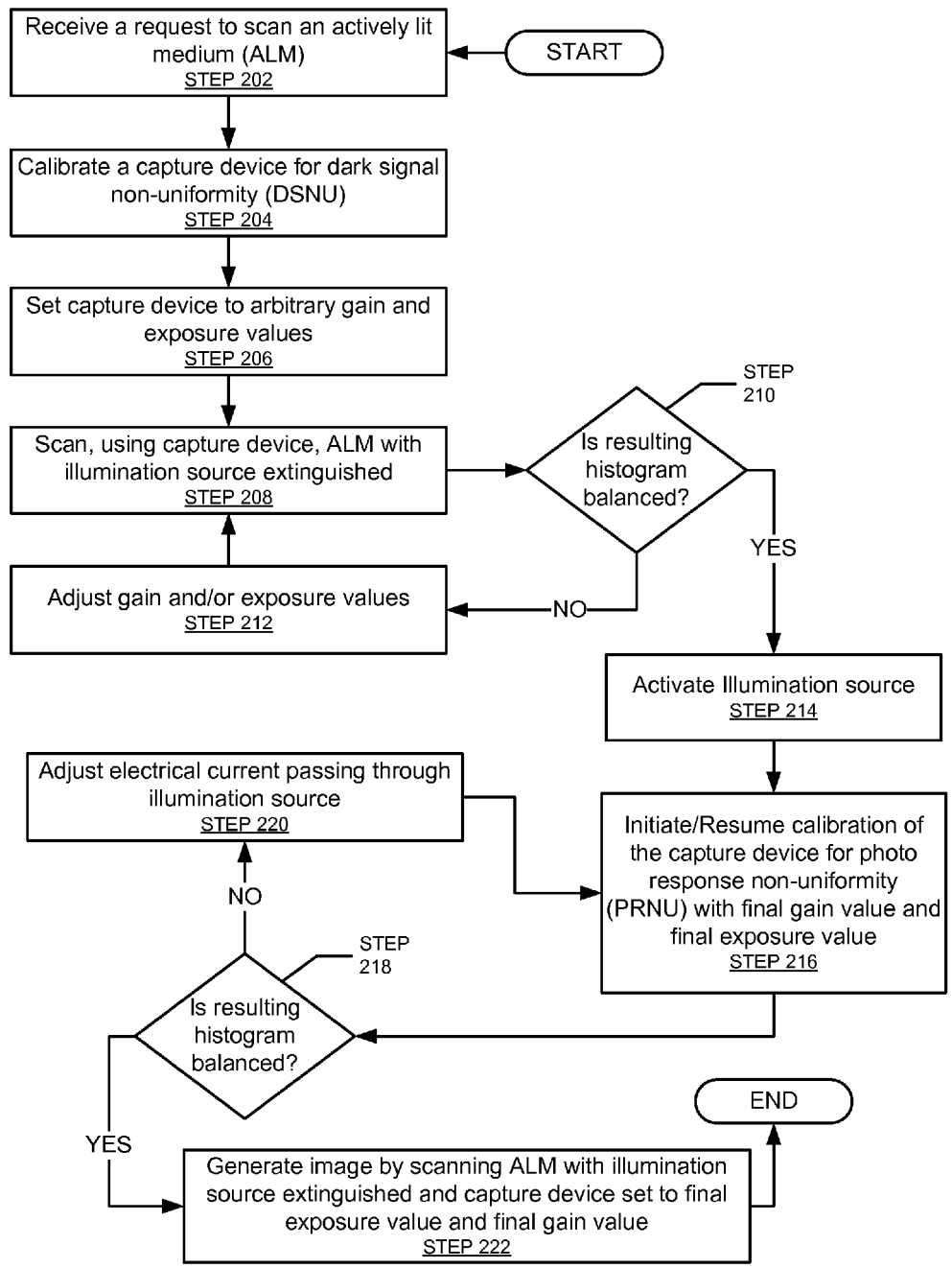
FIG. 2 shows a flowchart in accordance with one or more embodiments of the invention.

FIG. 2 shows a flowchart in accordance with one or more embodiments of the invention. The process shown in FIG. 2 may be used, for example, with the components of system (100), for obtaining an image of an ALM. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a request to scan an ALM is received (STEP 202). The request may be received by MFP having scanning functionality or by an external scanner. Specifically, a user may issue the request using one or more buttons on a control panel of the MFP/external scanner. As discussed above, the MFP/external scanner may include a platen on which the ALM should be placed, an illumination source for illuminating the platen, and a capture device for sensing light emitted/reflected/diffused by the ALM. Those skilled in the art, having the benefit of this detailed description, will appreciate that the request to scan the ALM is effectively a request from the user for an image of the ALM.

In STEP 204, the capture device is calibrated for DSNU. As discussed above, DSNU describes a parameter of fixed pattern noise (FPN). FPN is a noise pattern on digital imaging sensors that is often noticeable during longer exposure shots where certain pixels are susceptible to giving brighter intensities above the general background noise. DSNU refers to the offset from the average across the imaging array at a particular setting (e.g. temperature, integration time) with no external illumination. In other words, the calibration for DSNU is executed with the illumination source extinguished.

In STEP 206, the capture device is set to arbitrary gain and exposure values. In one or more embodiments of the invention, exposure corresponds to the time during which the sensor(s) in the capture device are active and absorbing photons. Once the exposure time has lapsed, the sensor(s) are deactivated. In one or more embodiments of the invention, gain corresponds to the factor by which the signal(s) output by the sensor(s) in the capture device and/or the capture device itself are amplified.

In STEP 208, the ALM is scanned with the capture device set to the selected gain and exposure values, while the illumination source is extinguished. The data resulting from the scan may be plotted as a histogram showing a distribution of pixel brightness.

In STEP 210, it is determined if the resulting histogram is balanced. In one or more embodiments of the invention, a well-balanced histogram corresponds to a histogram having a Gaussian distribution or at least a distribution where large numbers of pixels are not found on the edges of the brightness axis. When it is determined that the histogram is balanced, the selected gain/exposure values are deemed to be the final gain/exposure values, and the process proceeds to STEP 214. However, when it is determined that the histogram is unbalanced, the process proceeds to STEP 212, where the gain and/or exposure values are adjusted in order to produce a more balanced histogram. The process then returns to STEP 208.

In STEP 214, the illumination source of the MFP/external is activated using a non-zero electrical current. In STEP 216, PRNU calibration of the capture device is initiated (during first execution of STEP 216) or resumed (during subsequent execution of STEP 216). During the PRNU calibration, the capture device is set to the final exposure and gain values. In other words, the exposure and gain values are fixed during the PRNU calibration. The data resulting from a scan during the PRNU calibration may be plotted as a histogram showing a distribution of pixel brightness.

In STEP 218, it is determined if the resulting histogram is balanced. In one or more embodiments of the invention, a well-balanced histogram corresponds to a histogram having a Gaussian distribution or at least a distribution where large numbers of pixels are not found on the edges of the brightness axis. When it is determined that the histogram is balanced, the process proceeds to STEP 222. However, when it is determined that the histogram is unbalanced, the process proceeds to STEP 220, where the electrical current passing through the illumination source is adjusted to a different non-zero value in order to produce a more balanced histogram. The process then returns to STEP 216.

In STEP 222, an image is generated by scanning the ALM with the illumination source extinguished, and the capture device set to final exposure and gain values. The image may be a compressed or an uncompressed image of any format (e.g., BMP, GIF, JPEG, TIFF, etc.). The resulting image (i.e., image file) may be printed, faxed, emailed, stored, etc.

In one or more embodiments of the invention, STEPS 214, 216, 218, and 220 are omitted. In such embodiments, assuming STEP 210 is true (i.e., "YES"), the process proceeds from STEP 210 to STEP 222.

Figure 3:
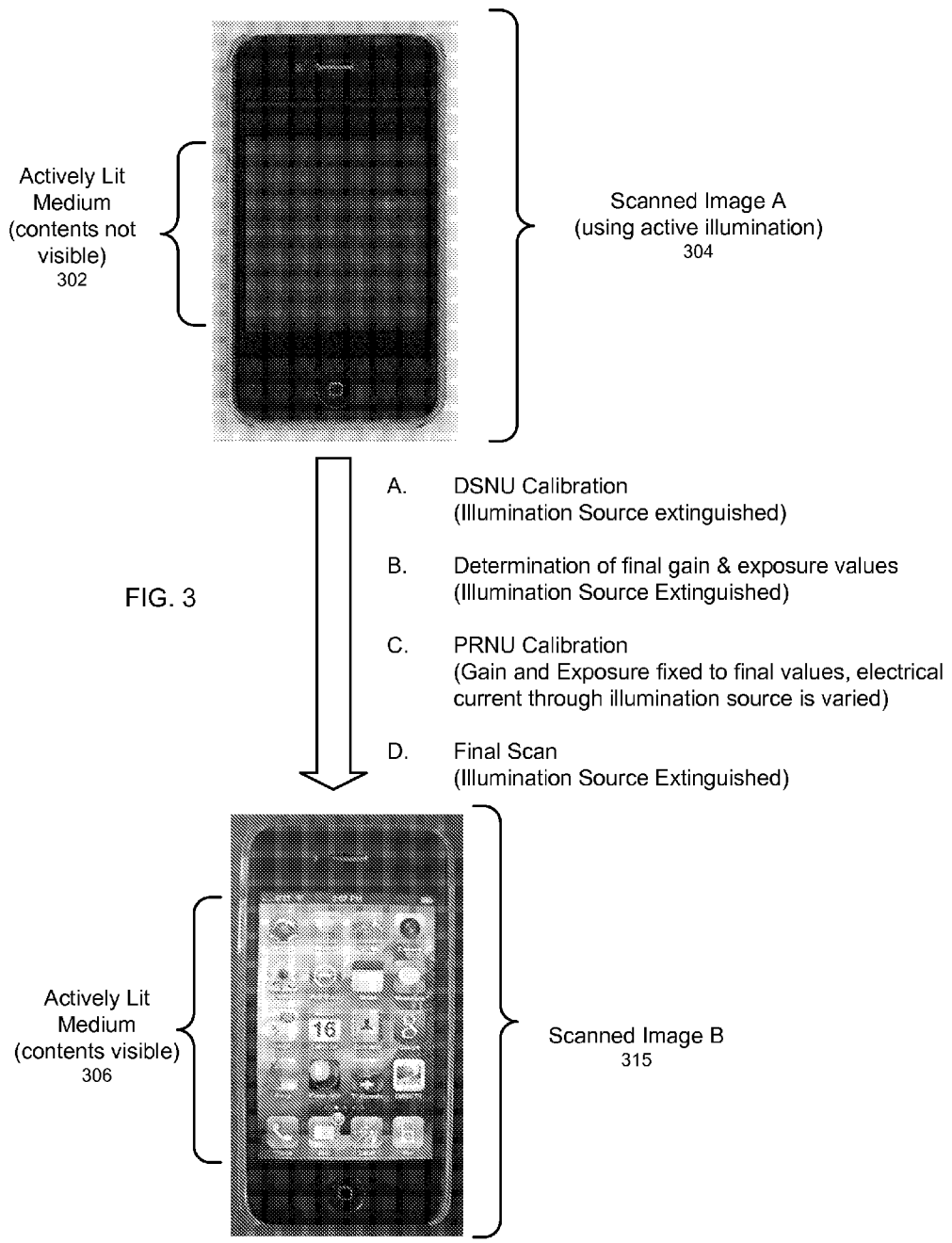
FIG. 3 shows an example in accordance with one or more embodiments of the invention.

FIG. 3 shows an example in accordance with one or more embodiments of the invention. Scanned image A (304) is the result of scanning an ALM using active illumination (i.e., the scanner's illumination source is activated and passing a non-zero electrical current). As shown in FIG. 3, the contents of the ALM (302) are not visible in the scanned image A (304) and the ALM appears dark. The ALM (302) in scanned image A (304) is dark due to the means by which the scanner optics are illuminated and calibrated coupled with how the ALM reflects light. As discussed above, a typical digital scanner optical system consists of a set of optics that image onto a capture device such as a linear CDD or CMOS sensor. The optical system is illuminated with a high intensity light source that actively illuminates passive media such as paper. Although active illumination is typically performed off the optical axes, typical passive media diffusely reflects light, and thus the media can be imaged back into the sensor with adequate illumination resulting in very readable output.

An ALM display, however, is typically not diffusively reflective, and acts much more like a mirrored surface that is very directional when illuminated. When the off-axis scanner illumination source illuminates the ALM display, most light does not reflect into the optical system and onto the scanner sensor. Also, because the brightness of the ALM display is much lower than the reflected light off of passive media from the scanner's illumination source, the display looks dark, as the scanner has been calibrated for much brighter output. This results in scanned image A (304).

In one or more embodiments of the invention, in order to generate a scanned image from an ALM, where the contents of the ALM are visible in the image, the scanner must only use the illumination supplied by the actively illuminated media, and not its own illumination source. Specifically, the scanner would perform passive (DSNU) calibration with the illumination source extinguished (A), and then initiate a scan of the platen to determine the proper exposure and gain required to capture readable output (B). This scan would consist of setting exposure and gain of the optical system to some arbitrary level, and then scanning the platen area. Based on scanned data, the scanner would determine if it is properly calibrated, or if it needs to adjust its exposure and/or gain and re-scan for calibration (this may be an iterative procedure). Once it is determined that proper exposure and gain are set with the illumination source extinguished (B), a PRNU calibration with illumination (C) is performed. The PRNU calibration varies current through the illumination source using the final fixed gain and exposure values identified. Once the PRNU process results in a balanced histogram of pixel brightness, a final scan of the platen area with the illumination source extinguished (D) is performed, and the scanned image is sent to the proper destination (e.g. printed output, digital file). As shown in FIG. 3, scanned image B (315) includes the contents (306) of the ALM.

Embodiments of the invention may have one or more of the following advantages: the ability to scan an ALM and have the contents of the ALM appear in the resulting image; the ability to perform PRNU calibration with fixed gain/exposure values by only varying electrical current passing through the scanner's illumination source; etc.

Figure 4:
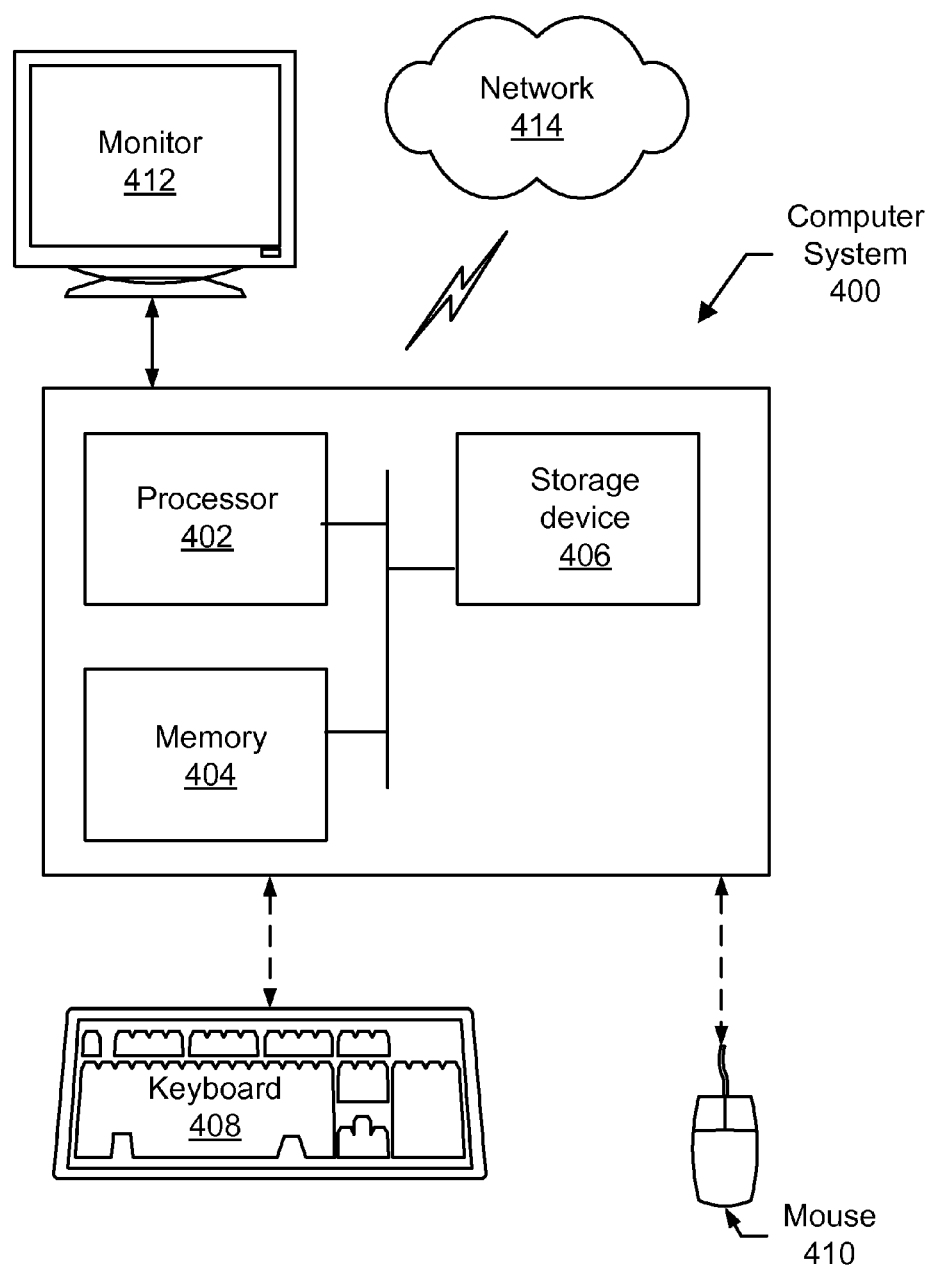
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), an associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. the hardware device, the multifunction printer) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining an image of an actively lit medium (ALM) of a hardware device using a scanner comprising a platen, a capture device, and an illumination source, the method comprising:
    calibrating the capture device for dark signal non-uniformity (DSNU);
    determining, with the hardware device placed on the platen of the scanner, a final exposure value and a final gain value by executing at least one scan of the ALM using the capture device with the illumination source extinguished; and
    generating the image by scanning, with the illumination source extinguished and with the hardware device placed on the platen of the scanner, the ALM using the capture device set to the final exposure value and the final gain value.

2. The method of claim 1, wherein determining the final exposure value and the final gain value comprises:
    setting the capture device to a first gain value and a first exposure value;
    obtaining a first histogram by scanning the ALM with the illumination source extinguished;
    setting, based on a balance of the first histogram, the capture device to a second gain value and a second exposure value; and
    obtaining a second histogram by scanning the ALM with the illumination source extinguished.

3. The method of claim 1, further comprising:
    calibrating, before generating the image, the capture device for photo response non-uniformity (PRNU) with the illumination source activated and the capture device set to the final gain value and the final exposure value.

4. The method of claim 3, wherein calibrating the capture device for PRNU comprises:
    obtaining a first histogram with the illumination source passing a first non-zero electrical current;
    adjusting, in response to a balance of the histogram, a power source of the illumination source; and
    obtaining, after adjusting the power source, a second histogram with the illumination source passing a second non-zero electrical current.

5. The method of claim 1, further comprising:
    receiving, from a user, a request to scan the ALM before determining the final exposure value and the final gain value with the illumination source extinguished.

6. The method of claim 1, wherein the ALM is a backlit liquid crystal display (LCD), and wherein the hardware device is a smart phone.

7. The method of claim 1, wherein the capture device comprises at least one selected from a group consisting of a charged-coupled device (CCD) sensor and a complementary metal oxide semiconductor (CMOS) sensor.

8. A non-transitory computer readable storage medium storing instructions for obtaining an image of an actively lit medium (ALM) of a hardware device using a scanner comprising a platen, a capture device, and an illumination source, the instructions comprising functionality for:
    calibrating the capture device for dark signal non-uniformity (DSNU);
    determining, with the hardware device on the platen of the scanner, a final exposure value and a final gain value from at least one scan of the ALM created by the capture device with the illumination source extinguished; and
    generating the image from scanning, with the illumination source extinguished and with the hardware device on the platen of the scanner, the ALM using the capture device set to the final exposure value and the final gain value.

9. The non-transitory computer readable storage medium of claim 8, wherein the instructions for determining the final exposure value and the final gain value comprise functionality for:
    setting the capture device to a first gain value and a first exposure value;

obtaining a first histogram from a first scan of the ALM with the illumination source extinguished;

setting, based on a balance of the first histogram, the capture device to a second gain value and a second exposure value; and obtaining a second histogram from a second scan the ALM with the illumination source extinguished.

10. The non-transitory computer readable storage medium of claim 8, the instructions further comprising functionality for:

calibrating, before obtaining the image, the capture device for photo response non-uniformity (PRNU) with the illumination source activated and the capture device set to the final gain value and the final exposure value.

11. The non-transitory computer readable storage medium of claim 8, wherein the instructions for calibrating the capture device for PRNU comprise functionality for:

obtaining a first histogram with the illumination source passing a first non-zero electrical current;

adjusting, in response to a balance of the histogram, a power source of the illumination source; and obtaining, after adjusting the power source, a second histogram with the illumination source passing a second non-zero electrical current.

12. The non-transitory computer readable storage medium of claim 8, the instructions further comprising functionality for:

receiving, from a user, a request to scan the ALM before determining the final exposure value and the final gain value using the capture device with the illumination source extinguished.

13. The non-transitory computer readable storage medium of claim 8, wherein the ALM is a backlit liquid crystal display (LCD), and wherein the hardware device is a smart phone.

14. The non-transitory computer readable storage medium of claim 8, wherein the capture device comprises at least one selected from a group consisting of a charged-coupled device (CCD) sensor and a complementary metal oxide semiconductor (CMOS) sensor.

15. A system for obtaining an image of an actively lit medium (ALM) of a hardware device, comprising:

a platen, an illumination source, and a capture device;

a dark calibrator configured to calibrate the capture device for dark signal non-uniformity (DSNU);

an optics settings module configured to determine, with the hardware device placed on the platen, a final exposure value and a final gain value from at least one scan of the ALM created by the capture device with the illumination source extinguished; and an imaging engine configured to generate the image from scanning, with the illumination source extinguished and with the hardware device placed on the platen, the ALM using the capture device set to the final exposure value and the final gain value.

16. The system of claim 15, further comprising:

a histogram engine configured to generate a first histogram and a second histogram from a plurality of scans of the ALM with the illumination source extinguished, wherein the first histogram corresponds to a first exposure value and a first gain value, wherein the second histogram corresponds to a second exposure value and a second gain value, and wherein the second histogram is generated based on a balance of the first histogram.

17. The system of claim 15, further comprising:

a photo calibrator configured to calibrate, before the image is generated, the capture device for photo response non-uniformity (PRNU) with the illumination source activated and the capture device set to the final gain value and the final exposure value.

18. The system of claim 17, further comprising:

a power source operatively connected to the illumination source; and a histogram engine configured to generate a first histogram and a second histogram from a plurality of scans with the illumination source activated, wherein the first histogram corresponds to a first non-zero electrical current passing through the illumination source, wherein the second histogram corresponds to a second non-zero electrical current passing through the illumination source, and wherein the power source is adjusted based on a balance of the first histogram.

19. The system of claim 15, wherein the ALM is a backlit liquid crystal display (LCD) of a mobile device, and wherein the hardware device is a smart phone.

20. The system of claim 15, wherein the capture device comprises at least one selected from a group consisting of a charged-coupled device (CCD) sensor and a complementary metal oxide semiconductor (CMOS) sensor.

* * * * *